United States Patent
Shin et al.

(10) Patent No.: US 10,671,354 B2
(45) Date of Patent: Jun. 2, 2020

(54) METHOD, SYSTEM AND APPARATUS FOR GENERATING SOURCE CODE FROM TABLE AND USING THE SAME

(71) Applicant: Samsung Electronics Co., Ltd., Suwon-si, Gyeonggi-do (KR)

(72) Inventors: Han-kyeol Shin, Suwon-si (KR); Jong-han Kim, Yongin-si (KR); Tae-hee Lee, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 23 days.

(21) Appl. No.: 16/181,964

(22) Filed: Nov. 6, 2018

(65) Prior Publication Data
US 2019/0205101 A1 Jul. 4, 2019

(30) Foreign Application Priority Data
Jan. 2, 2018 (KR) .................. 10-2018-0000266

(51) Int. Cl.
*G06F 8/30* (2018.01)
*G06F 8/10* (2018.01)
*G06F 8/41* (2018.01)

(52) U.S. Cl.
CPC .............. *G06F 8/30* (2013.01); *G06F 8/10* (2013.01); *G06F 8/41* (2013.01)

(58) Field of Classification Search
CPC ..... G06F 8/10; G06F 8/30; G06F 8/35; G06F 8/41; H04L 69/06
USPC .................................................. 717/106–109
See application file for complete search history.

(56) References Cited

U.S. PATENT DOCUMENTS

| H1837 H | 2/2000 | Fletcher et al. |
|---|---|---|
| 6,310,888 B1 | 10/2001 | Hamlin |
| 6,940,870 B2 | 9/2005 | Hamlin |
| 7,327,756 B2 | 2/2008 | Hamlin |
| 2002/0157041 A1 | 10/2002 | Bennett et al. |
| 2007/0016889 A1* | 1/2007 | Miyazaki .................. G06F 8/24 717/106 |
| 2017/0286438 A1 | 10/2017 | Puccio, III |

FOREIGN PATENT DOCUMENTS

| JP | H11231924 A | 8/1999 |
|---|---|---|
| JP | 2002-215450 A | 8/2002 |
| JP | 2016-218851 A | 12/2016 |
| KR | 10-2004-0029732 A | 4/2004 |

OTHER PUBLICATIONS

Extended European Search Report dated Jun. 3, 2019 for corresponding European Application No. 18213465.0.

* cited by examiner

*Primary Examiner* — Qing Chen
(74) *Attorney, Agent, or Firm* — Harness, Dickey & Pierce, P.L.C.

(57) ABSTRACT

A method of automatically generating a source code for implementing a function in hardware according to specifications defining a communication protocol includes: obtaining input data including the specifications; preprocessing the input data by extracting a table including a plurality of fields from the input data and classifying the table; generating structured data by performing lexical analysis on values of the plurality of fields according to a desired rule; and generating the source code from the structured data.

20 Claims, 17 Drawing Sheets

FIG. 2A

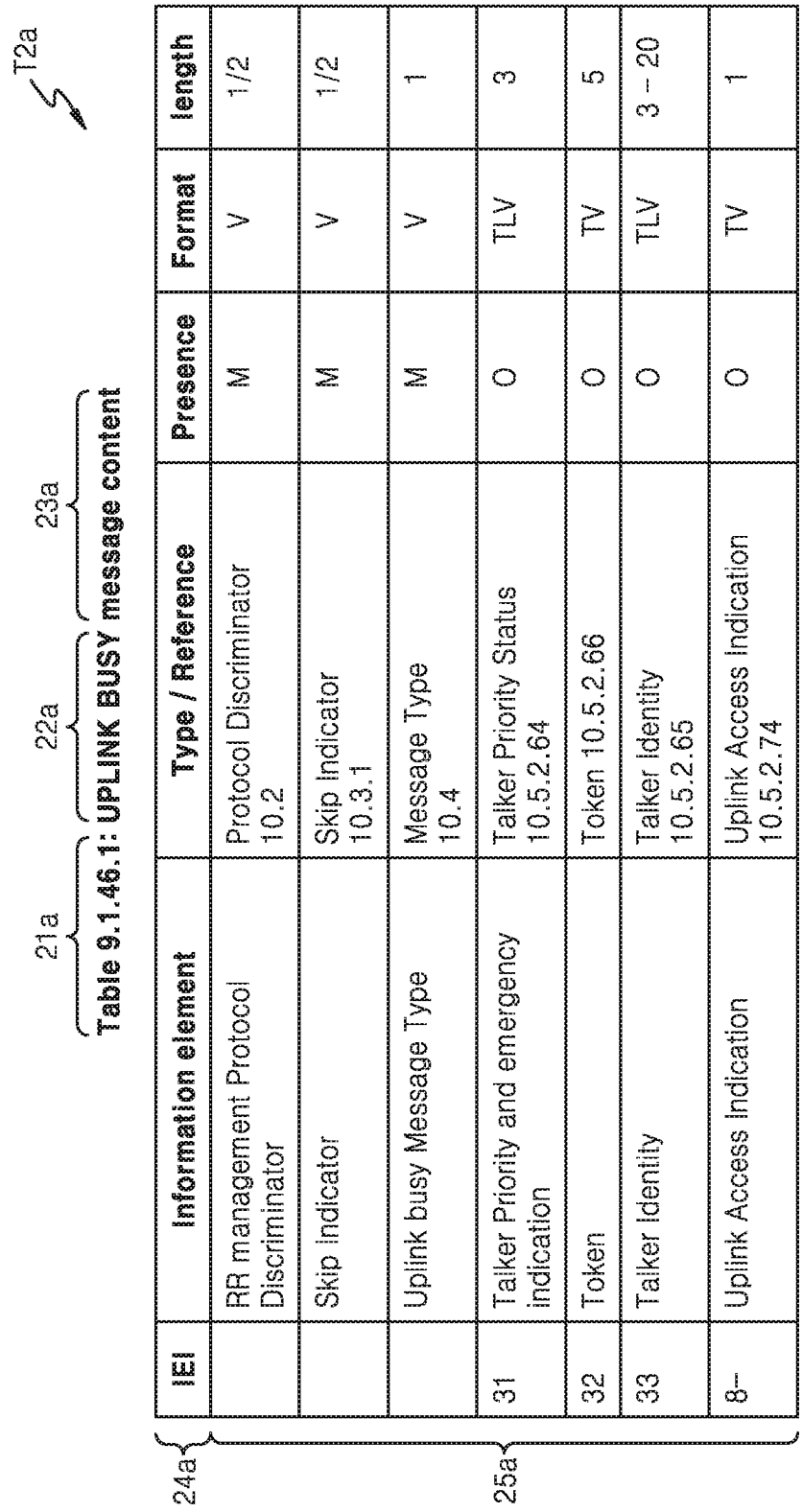

Table 9.1.46.1: UPLINK BUSY message content

| IEI | Information element | Type / Reference | Presence | Format | length |
|---|---|---|---|---|---|
|  | RR management Protocol Discriminator | Protocol Discriminator 10.2 | M | V | 1/2 |
|  | Skip Indicator | Skip Indicator 10.3.1 | M | V | 1/2 |
|  | Uplink busy Message Type | Message Type 10.4 | M | V | 1 |
| 31 | Talker Priority and emergency indication | Talker Priority Status 10.5.2.64 | O | TLV | 3 |
| 32 | Token | Token 10.5.2.66 | O | TV | 5 |
| 33 | Talker Identity | Talker Identity 10.5.2.65 | O | TLV | 3 – 20 |
| 8– | Uplink Access Indication | Uplink Access Indication 10.5.2.74 | O | TV | 1 |

Figure 10.5.2.64.1: Talker Priority Status information element

Figure 10.5.2.21a.1: Mobile Time Difference information element

Figure 10.5.2.21aa.1: MultiRate configuration information element

FIG. 5A

```
                                                              D50a item1 {
    IEI = None
    IE = "RR management Protocol Discriminator"
    Type = "Progocol Discriminator"            } D51
    Presence = M
    Format = V
    lengthType = const
    length = 0.5
}

...

item6 {
    IEI = 0x33
    IE = "Talker Identity"
    Type = "Talker Identity"
    Presence = O                                } D56
    Format = TLV
    lengthType = var
    min-length = 3
    max-length = 20
}
item7 {
    IEI = 0x8
    IE = "Uplink Access Indication"
    Type = "Uplink Access Indication"           } D57
    Presence = O
    Format = TV
    lengthType = const
    length = 1
}
```

```
                                    D50b
table {
    Name = "UPLINK BUSY"
    itemList [] = { item1,
                    item2,
                    item3,
                    item4,
                    item5,
                    item6,
                    item7 }
}
```

```
01  UplinkBusy_t {
02      ProtocolDiscriminator_t RRmanagementProtocolDiscriminator;
...     ...
07      TalkerIdentity_t TalkerIdentity;
08      UplinkAccessIndication_t UplinkAccessIndication;
09  }
```

```
01  <UPLINK BUSY> :=
02      <RR management Protocol Discriminator : Protocol Discriminator>
...     ...
07      <Talker Identity : Talker Identity>
08      <Uplink Access Indication : Uplink Access Indication>;
```

```
01  UplinkBusyEncoder (UplinkBusy_t input, ... ) {
02      ProtocolDiscriminatorEncoder(input->RRmanagementProtocolDiscriminator);
...     ...
07      TalkerIentityEncoder(input->TalkerIdentity);
08      UplinkAccessIndicationEncoder(input->UplinkAccessIndicator); }
09  }
```

FIG. 10A

```
                                    D100a
item1 {
    type = IEI
    name = null        } D101
    length = 7
}
item2 {
    type = LENGTH
    name = null        } D102
    length = 8
}
item3 {
    type = VAL
    name = "ES"        } D103
    length = 1
}
item4 {
    type = SPARE
    name = null        } D104
    length = 3
}
item5 {
    type = VAL
    name = "UAI"       } D105
    length = 1
}
item6 {
    type = VAL
    name = "Priority"  } D106
    length = 3
}
```

```
table {
    Name = "Talker Priority Status"
    itemList [] = { item1,
                    item2,
                    item3,
                    item4,
                    item5,
                    item6 }
}
```
D100b

```
01    < Talker Priority Status > ::=
02        < IEI : bit(7) >
03        < Length : Octet >
04        < Talker Priority Status : bit(8) >
05        < ES : bit(1) >
06        < Spare : bit(3) >
07        < UAI : bit(1) >
08        < Priority : bit(3) >;
```

```
01   TalkerPriorityStatusEncoder(int packedLen, void* target, u8* buffer) {
02        TalkerPriorityStatus *input = (TalkerPriorityStatus*) target;
03
04        InitBuffer(buffer, 7, packedLen);
05        packedLen = BitPacking8((u8)((input->iei)&0xFF), buffer, 7, packedLen);
06
07        InitBuffer(buffer, 8, packedLen);
08        packedLen = BitPacking8((u8)((input->length)&0xFF), buffer, 8, packedLen);
09
10        InitBuffer(buffer, 1, packedLen);
11        packedLen = BitPacking8((u8)((input->ES)&0xFF), buffer, 1, packedLen);
12
13        packedLen +=3;
14
15        InitBuffer(buffer, 1, packedLen);
16        packedLen = BitPacking8((u8)((input->UAI)&0xFF), buffer, 1, packedLen);
17
18        InitBuffer(buffer, 3, packedLen);
19        packedLen = BitPacking8((u8)((input->Priority)&0xFF), buffer, 3, packedLen);
20
21        return packedLen;
22   }
```

METHOD, SYSTEM AND APPARATUS FOR GENERATING SOURCE CODE FROM TABLE AND USING THE SAME

CROSS-REFERENCE TO RELATED APPLICATION

This U.S. non-provisional application claims the benefit of priority under 35 U.S.C. § 119 to Korean Patent Application No. 10-2018-0000266, filed on Jan. 2, 2018, in the Korean Intellectual Property Office, the disclosure of which is incorporated herein in its entirety by reference.

BACKGROUND

Various example embodiments of the inventive concepts relate to a communication protocol, and more particularly, to a system, method apparatus, and/or non-transitory computer readable medium for implementing a function according to a communication protocol in hardware.

Communication protocols may be defined and/or predefined for normal communication between a transmitting side and a receiving side. The transmitting side may transmit a signal generated by converting data according to a communication protocol, whereas the receiving side may obtain data by converting the received signal according to the communication protocol. A new communication protocol may be developed to support new and/or improved features, such as a high throughput, and the transmitting side and the receiving side may be designed to support the new communication protocol.

Communication protocols may define various pieces of information, and may define methods of processing information. For example, in a wireless communication system, a communication protocol may define various messages transmitted through an uplink and a downlink between a base station and a terminal, and may define modulation/demodulation and encoding/decoding methods of messages. Designing a transmitting side and a receiving side for supporting a communication protocol may include an operation of implementing various pieces of information and processing methods of information defined by the communication protocol, and this operation may require a long time.

SUMMARY

Various example embodiments of the inventive concepts provide a system, method, apparatus, and/or non-transitory computer readable medium for generating and/or automatically generating a source code for performing a function according to a communication protocol. Additionally, various example embodiments may be related to a method, system, apparatus, and/or non-transitory computer readable medium for performing (and/or causing the performance of) the function based on the generated and/or automatically generated source code.

According to an aspect of at least one example embodiment of the inventive concepts, there is provided a method of generating a source code for implementing a function in hardware according to specifications defining a communication protocol, the method including: obtaining, using at least one processor, input data comprising the specifications, preprocessing, using the at least one processor, the input data by extracting at least one table comprising a plurality of fields from the input data, classifying, using the at least one processor, the extracted table, generating, using the at least one processor, structured data by performing lexical analysis on values of the plurality of fields according to a desired rule associated with the classification of the extracted table, and generating, using the at least one processor, the source code from the structured data.

According to another aspect of at least one example embodiment of the inventive concepts, there is provided a system including: a memory having computer readable instructions stored thereon, and at least one processor configured to execute the computer readable instructions to perform the method.

According to another aspect of at least one example embodiment of the inventive concepts, there is provided a control method of a communication apparatus for performing communication according to specifications defining a communication protocol, the control method including: generating, using at least one first processor, source code defining a codec associated with the communication protocol, the generating including extracting a table from input data including the specifications and performing lexical analysis on values of a plurality of fields included in the table according to a desired rule, compiling, using the at least one first processor, the source code to generate executable data, and provisioning, using the at least one first processor, the executable data into the communication apparatus.

According to another aspect of at least one example embodiment of the inventive concepts, there is provided an operation method of a communication apparatus for performing communication according to specifications defining a communication protocol, the operation method including: extracting, using at least one processor, a table from input data, the input data comprising the specifications, generating, using the at least one processor, at least one codec associated with the communication protocol based on the extracted table, accessing, using the at least one processor, the at least one codec, and processing, using the at least one processor, communication data corresponding to the communication protocol based on the at least one codec.

BRIEF DESCRIPTION OF THE DRAWINGS

Various example embodiments of the inventive concepts will be more clearly understood from the following detailed description taken in conjunction with the accompanying drawings in which:

FIGS. 2A to 2D show example tables showing specifications of a communication protocol, according to some example embodiments;

FIGS. 5A and 5B show examples of structured data of FIG. 1, according to some example embodiments;

FIG. 6 is a flowchart showing an example of operation S80 of FIG. 1, according to at least one example embodiment;

FIGS. 7A and 7B show examples of a source code defining a message structure, according to some example embodiments;

FIG. 8 shows an example of a source code defining codec, according to at least one example embodiment;

FIGS. 10A and 10B show examples of structured data of FIG. 1, according to some example embodiments;

FIG. 11 is a flowchart showing an example of operation S80 of FIG. 1, according to at least one example embodiment;

FIG. 12 shows an example of a source code defining an information element structure, according to at least one example embodiment;

FIG. 13 shows an example of a source code defining codec, according to at least one example embodiment;

DETAILED DESCRIPTION

Figure 1:
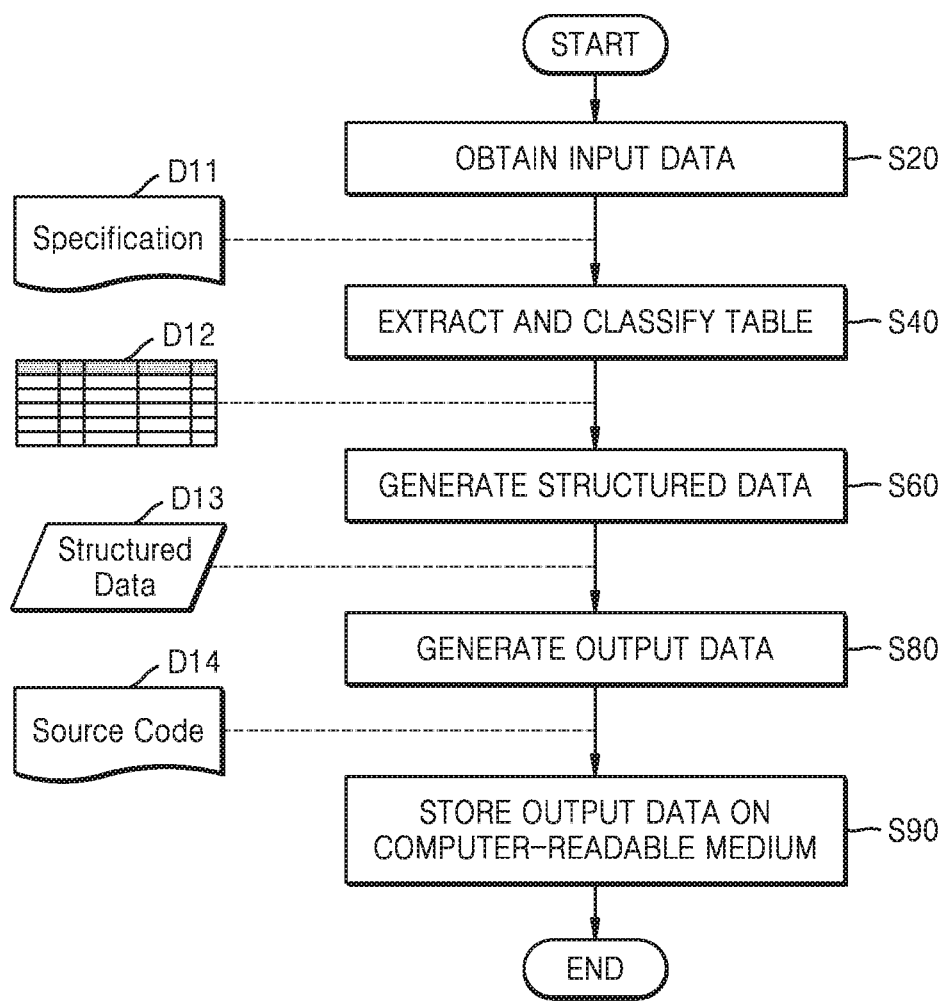
FIG. 1 is a flowchart showing a method of generating and/or automatically generating a source code, according to at least one example embodiment.

FIG. 1 is a flowchart showing a method of generating and/or automatically generating a source code, according to at least one example embodiment. FIGS. 2A to 2D show example tables showing example specifications of a communication protocol, according to some example embodiments. In some example embodiments, the method of FIG. 1 may be performed by a system (e.g., a computing system 100 of FIG. 16, etc.) including at least one processor and a memory device (e.g., RAM, ROM, solid state memory, hard drive, etc.), but is not limited thereto, and may generate output data D14 including source code from input data D11, the input data D11 including, for example, one or more specifications defining at least one communication protocol, but is not limited thereto. As shown in FIG. 1, the method of generating and/or automatically generating a source code may include a plurality of operations S20, S40, S60, S80, and S90, etc., but is not limited thereto.

In operation S20, an operation of obtaining the input data D11 may be performed. In some example embodiments, the input data D11 may be an electronic document, or file, (e.g., XML, HTML, PDF, spreadsheet files, database files, a file associated with a programming language, a file associated with a compiler or interpreter, a file associated with an interface, etc.) defining a communication protocol. For example, the 3rd Generation Partnership Project (3GPP), which is a collaborative research project between telecommunication organizations, discloses (e.g., distributes) an electronic document including specifications defining at least one communication protocol for wireless communication through the Internet. Also, operators running telecommunication networks provide specifications defining their communication protocols. Specifications defining a communication protocol for bilateral communication, such as wired communication, for example, communication networks, such as wide area network (WAN) and local area network (LAN), universal serial bus (USB), etc., as well as wireless communication may also be predefined. Although example embodiments of the present disclosure will be hereinafter described mainly with reference to specifications that the 3GPP discloses, it will be understood that example embodiments of the inventive concepts are not limited thereto. The input data D11 may be obtained through a communication network in some example embodiments, and may be obtained from a storage medium in some example embodiments.

Figure 2B:
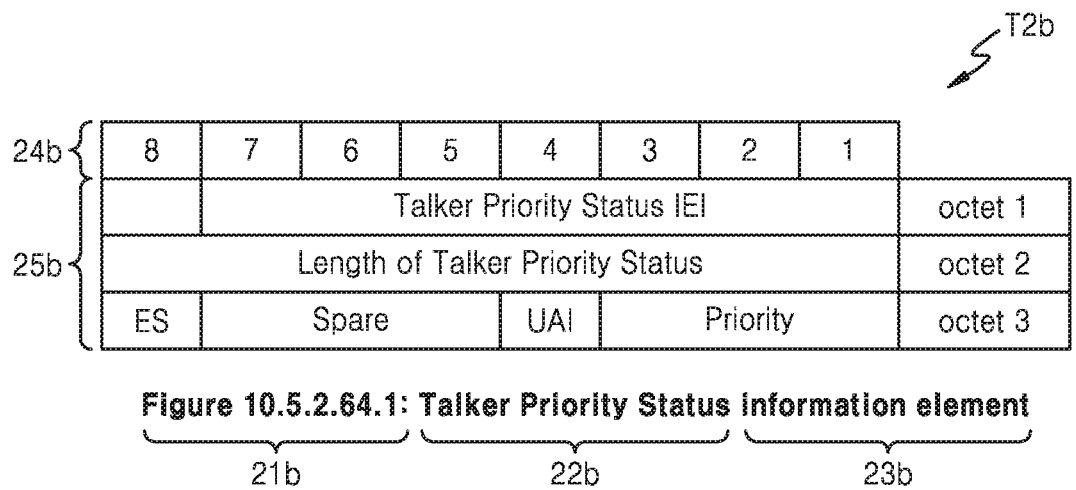
Figure 2C:
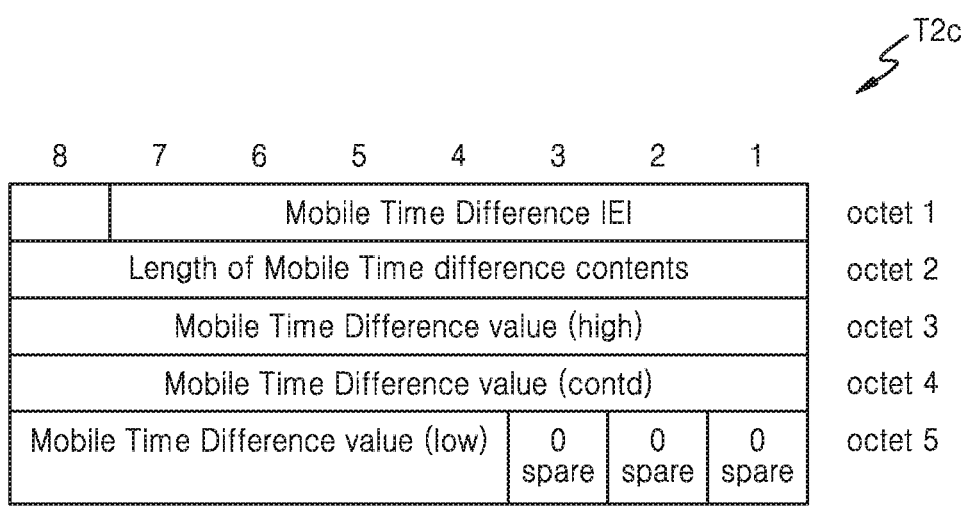
Figure 2D:
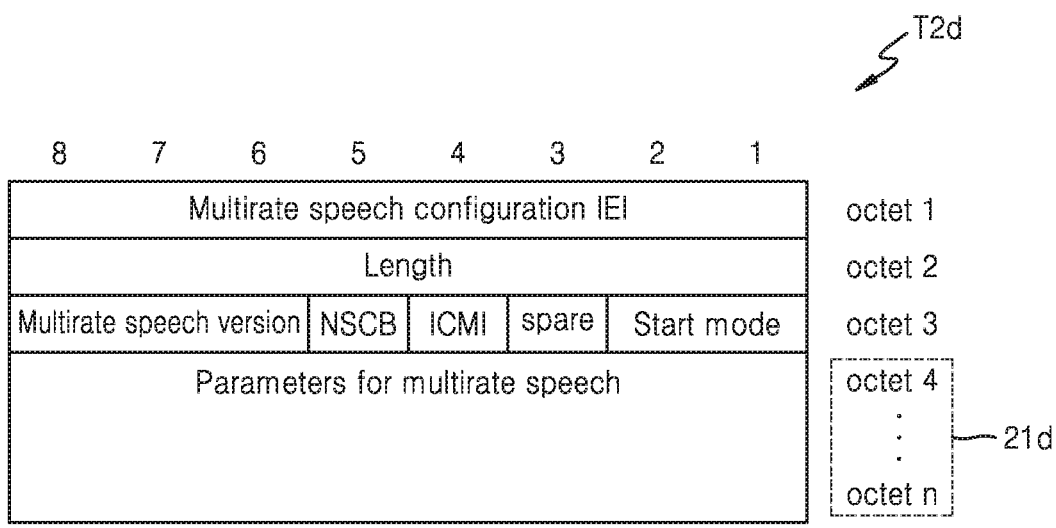

The input data D11 may include a plurality of tables, and specifications included in the input data D11 may be expressed as the plurality of tables. For example, the input data D11 may include a message table T2a defining a message as shown in FIG. 2A, or may include tables T2b, T2c, and T2d defining an information element (IE), as shown in FIGS. 2B to 2D. As the complexity of the communication protocol increases, the number and/or the size of the tables included in the input data D11 may increase. Additionally, a designer of a communication apparatus (e.g., mobile device, smartphone, etc.) using the specification tables to design the communication apparatus not only may require a remarkably long time to study the tables, but the complexity of the tables also may increase the possibility of errors.

Figure 4:
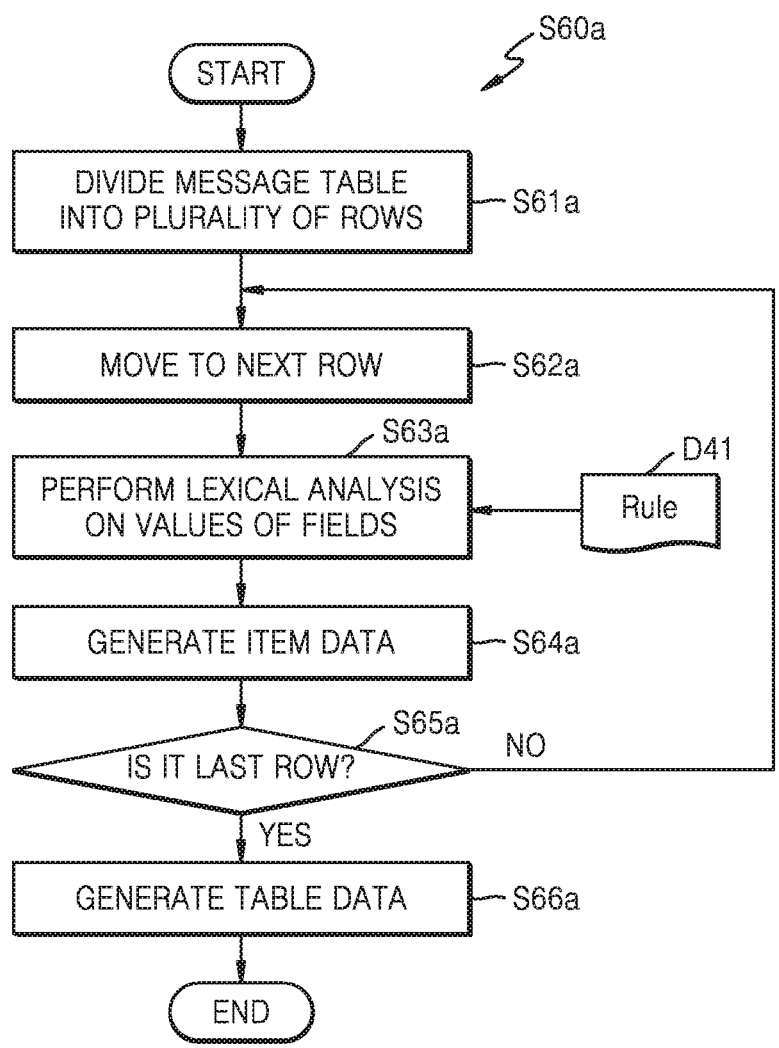
FIG. 4 is a flowchart showing an example of operation S60 of FIG. 1, according to at least one example embodiment.
Figure 9:
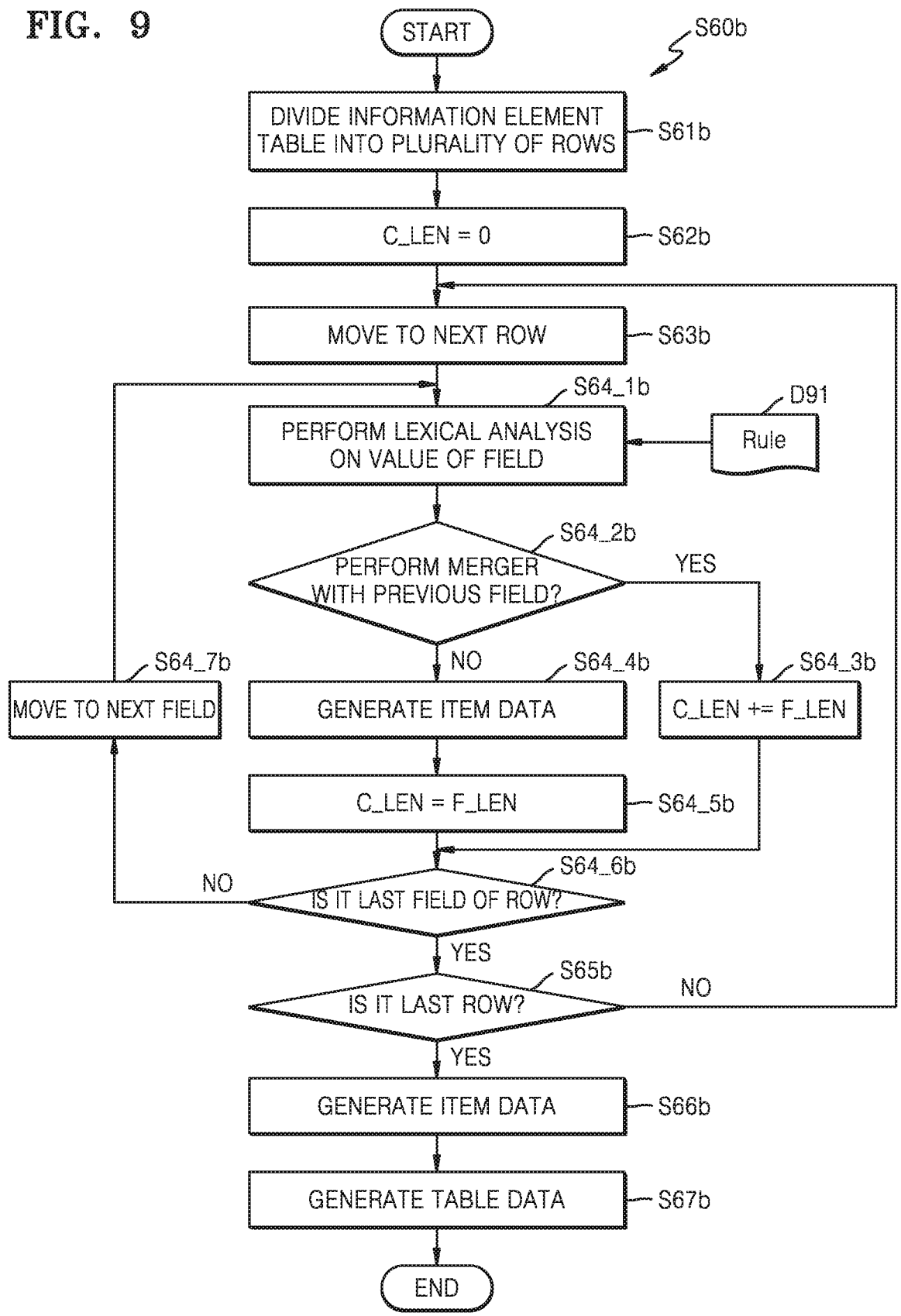
FIG. 9 is a flowchart showing an example of operation S60 of FIG. 1, according to at least one example embodiment.

In operation S40, an operation of extracting and classifying a table D12 may be performed. As described above, specifications of the input data D11 may be expressed as a plurality of tables, but is not limited thereto, and the plurality of tables may be extracted from the input data D11, and each of the plurality of tables may be classified according to type. In some example embodiments, a type of the table D12 may be recognized based on at least one of a title of the table D12, values of fields included in a first row of the table D12, and the number of columns included in the table D12, but the example embodiments are not limited thereto, and the table D12 may be classified according to the recognized type. In at least one example embodiment, the classification type of a table may be provided as metadata in the electronic document, may be provided by user input, may be provided via a separate document, etc. In the following operations S60 and S80, as shown in FIGS. 4, 9, etc., the table D12 may have source code generated in a manner determined according to the classification of the table D12. According to at least one example embodiment, an operation of extracting the table D12 from the input data D11 and classifying the table D12 may be referred to as a pre-processing operation of the input data D11. Hereinafter, different types of example tables T2a, T2b, T2c, and T2d will be described with reference to FIGS. 2A to 2D, and a redundant description of FIGS. 2B to 2D showing the tables T2b, T2c, and T2d, which are IE tables, will be omitted.

Referring to FIG. 2A, the message table T2a may include "Table 9.1.46.1: UPLINK BUSY message content" as a title, and the title of the message table T2a may include a first portion 21a indicating an index of the message table T2a, a second portion 22a indicating a name of the message table T2a, and a third portion 23a indicating a type of the message table T2a, etc. Also, the message table T2a may include a first row 24a including names of columns, and at least one row 25a indicating at least one item, etc. In some example embodiments, the message table T2a may be classified as a message table according to the third portion 23a from among the title of the message table T2a indicating a type of the message table T2a. In some example embodiments, the message table T2a may be classified as a message table according to the value of fields included in the first row 24a, for example, "Type/Reference", which is a value included in a third field, etc. In some example embodiments, the message table T2a may be classified as a message table according to the number of columns (that is, 6), etc.

Rows of the message table T2a may respectively correspond to IEs as items, and fields included in the same column may have a common format. For example, a first column of the message table T2a may correspond to an information element index (IEI), and fields included in the first column may have, for example, no value, may have a two-digit hexadecimal value, and as in a first field of an eighth row, may have a one-digit hexadecimal, that is, 4-bit length, value, etc. A second column of the message table T2a may correspond to a name of the IE, and fields included in the second column may have, for example, text as a value. A third column of the message table T2a may correspond to a type and reference of the IE, and fields included in the third column may have, for example, text and index as a value, etc. A fourth column of the message table T2a may correspond to information indicating, for example, whether the IE is necessary or not, and fields included in the fourth column may have, for example, one of "M" corresponding to "mandatory", "O" corresponding to "optional", and "C" corresponding to "conditional" as a value, etc. A fifth column of the message table T2a may correspond to a format of the IE, and fields included in the fifth column may have, for example, one or more combinations of "T" corresponding to "type", "L" corresponding to "length", and "V" corresponding to "value" as a value, etc. A sixth column of the message table T2a may correspond to a length of the IE, fields included in the sixth column may have, for example, a number such as "½" or may have a range such as "3-20" or "2-n" as a value, and a unit of the length may be an octet (that is, 8-bit), etc. Likewise, based on a common format that fields included in one column have, lexical analysis may be performed on values of fields, and useful information may be extracted.

Referring to FIG. 2B, the IE table T2b may include "FIG. 10.5.2.64.1: Talker Priority Status information element" as the title, and the title of the IE table T2b may include a first portion 21b indicating an index of the IE table T2b, a second portion 22b indicating a name of the IE table T2b, and a third portion 23b indicating a type of the IE table T2b, etc. Also, the IE table T2b may include a first row 24b including names of columns, and at least one row 25b indicating at least one item, etc. In a similar way to that described above with reference to FIG. 2A, in some example embodiments, the IE table T2b may be classified as an IE table according to the third portion 23b from among the title of the IE table T2b indicating a type of the IE table T2b. In some example embodiments, the IE table T2b may be classified as an IE table according to the value of fields included in the first row 24b, for example, "8", which is a value included in a first field. In some example embodiments, the IE table T2b may be classified as an IE table according to the number of columns (that is, 9).

Items of the IE table may respectively correspond to codes allocated to, for example, a bit sequence, and eight columns may respectively correspond to 8 bits of an octet. For example, the first row 24b of the IE table T2b may include fields having indexes of eight bits as a value. A field corresponding to the same code in one row may correspond to one or more columns. For example, as shown in FIG. 2B, the last row of the IE table T2b may include four fields, and the four fields may respectively correspond to four codes, that is, "ES", "Spare", "UAI", and "Priority", but the example embodiments are not limited thereto. Also, fields included in the last column of the IE table T2b, that is, a ninth column, may have octet indexes of rows, etc.

The IE table may include fields corresponding to the same code in two or more rows. For example, as shown in FIG. 2C, "Mobile Time Difference Value (high)" of a fourth row, "Mobile Time Difference Value (contd)" of a fifth row, and "Mobile Time Difference Value (low)" of a sixth row in the IE table T2c may correspond to one code having a 21-bit length, etc. Likewise, two or more fields corresponding to one code may include notation (e.g., "(high part)", "(low part)", "(high)", "(cont)", "(contd)", "(low)", etc.) indicating the location of a field in the code.

The IE table may define a code having a variable length. For example, as shown in FIG. 2D, a field 21d of a ninth column corresponding to an octet index in the IE table T2d may have "octet 4 . . . octet n" as a value, and "n" may be determined according to a code "Multirate speech version" in octet 3. In some example embodiments, a variable length of a code may be expressed as "octet 4-n". Likewise, an encoder/decoder having a different type from that of a code having a fixed length may be used for a code having a variable length.

Referring to FIG. 1 again, in operation S60, an operation of generating structured data D13 from the table D12 may be performed. The structured data D13, which is intermediate data generated from the table D12 to generate source code corresponding to the specification, may be generated by performing lexical analysis on values of a plurality of fields included in the table D12 according to a desired and/or predefined rule associated to, related to, and/or corresponding to the classification of the table D12. In some example embodiments, a rule may be desired and/or predefined by using regular expression, etc., and lexical analysis may be performed by a lexer referring to normal expression, etc. The structured data D13 may include table data including attributes of the table D12, and item group data including attributes of at least one item included in the table D12, and the item group data may include item data corresponding to the item, etc. Examples of operation S60 will be described below with reference to FIGS. 4, 9, etc.

In operation S80, an operation of generating the output data D14 including a source code from the structured data D13 may be performed. The source code may refer to data written in text related to a programming language (e.g., human readable instructions and/or computer readable instructions) according to a desired and/or predefined rule to define a certain object or operation. For example, as a non-limiting example, the source code may be written in a programming language such as C, C++, JAVA, etc., may be written in notation, such as Concrete Syntax Notation One (CSN.1), SQL, JSON, CSV, etc., indicating a data structure used in communication, may be written in an interface description language, such as Abstract Syntax Notation One (ASN.1), may be written in a markup language, such as XML or HTML, etc., indicating a data structure used in communication. In some example embodiments, the source code may define a data structure which may be used to implement message building blocks of a communication protocol, and in some example embodiments, the source code may define a codec, for example, an encoder and/or a decoder, which may be used to implement message transmission/reception blocks according to and/or in compliance with the communication protocol. According to at least one example embodiment, generation of output data including a source code may be referred to as generation of the source code.

In operation S90, an operation of storing the output data D14 including the source code on a computer-readable medium (e.g., a non-transitory computer readable medium) may be performed. For example, the computer-readable medium may include non-volatile memory such as Electrically Erasable Programmable Read-Only Memory (EEPROM), flash memory, Phase Change Random Access Memory (PRAM), Resistance Random Access Memory (RRAM), Nano Floating Gate Memory (NFGM), Polymer Random Access Memory (PoRAM), Magnetic Random Access Memory (MRAM), Ferroelectric Random Access Memory (FRAM), etc., or may include storage media such as a magnetic tape, an optical disk, or a magnetic disk. In some example embodiments, the structured data D13 generated in operation S60 may also be stored on the non-transitory computer-readable medium.

As described above, structured data able to be processed by a computer (and/or a computing system, a distributed processing system, a cloud processing system, etc.) may be generated from input data including a vast amount of specifications as unstructured data, and a source code able to be executed by the computer may be generated and/or automatically generated from the structured data. Thus, as a source code for implementing a function according to a communication protocol is generated and/or automatically generated, a time required to implement the function may be reduced, and further, errors that may occur during implementation of the function may be reduced and/or prevented. In addition, due to the generated and/or automatically generated source code, high compatibility between functions designed in a distributed fashion may be provided.

Figure 3:
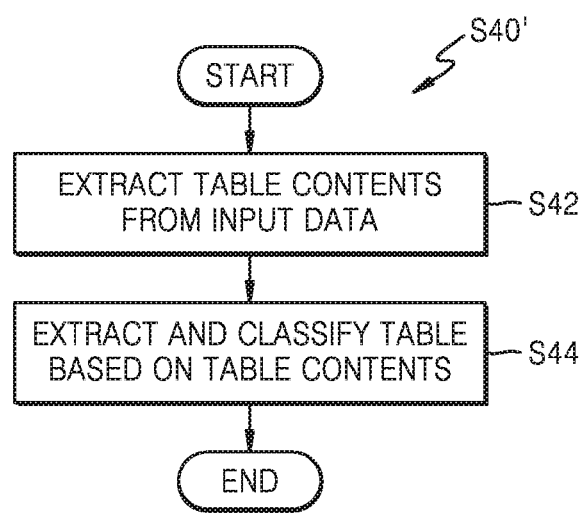
FIG. 3 is a flowchart showing an example of operation S40 of FIG. 1, according to at least one example embodiment.

FIG. 3 is a flowchart showing an example of operation S40 of FIG. 1, according to at least one example embodiment. As described above with reference to FIG. 1, an operation of extracting the table D12 from the input data D11 and classifying the table D12 may be performed in operation S40' of FIG. 3. FIG. 3 will be hereinafter described with reference to FIG. 1.

In operation S42, an operation of extracting table contents from the input data D11 may be performed. For example, the input data D11 may include table contents in the beginning, and the table contents may include an index, a title and/or a location (e.g. a page) of a table, etc., but the example embodiments are not limited thereto.

In operation S44, an operation of extracting and classifying a table based on the table contents may be performed. For example, a table may be found (e.g., located, identified, and/or searched for) by referring to an index and/or a location of the table included in the table contents, and the found table may be extracted. Also, a type (e.g., table type) of the extracted table may be recognized, for example, by referring to a title of the table included in the table contents, but is not limited thereto, and the table may be classified according to the type of the table.

Figures 5B, 6:
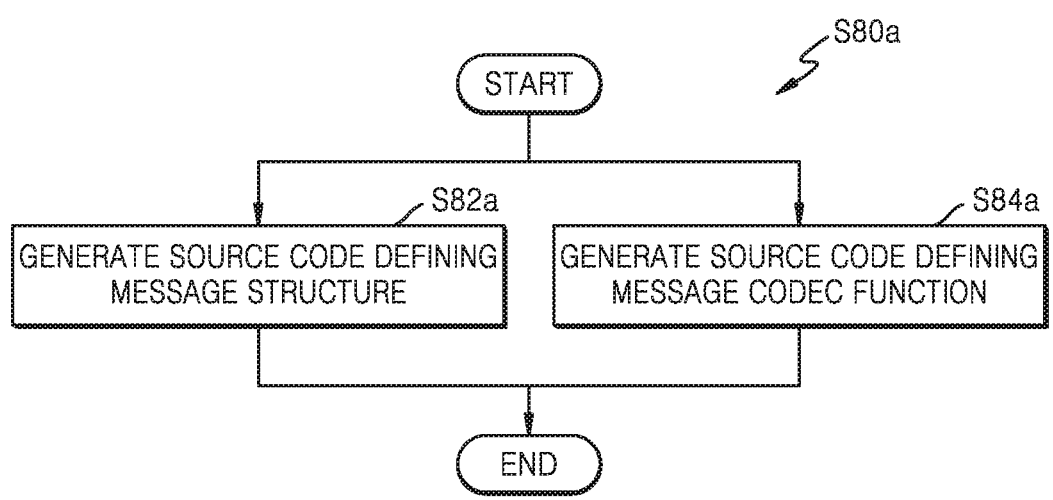

FIG. 4 is a flowchart showing an example of operation S60 of FIG. 1, according to at least one example embodiment. FIGS. 5A and 5B show examples of the structured data D13 of FIG. 1, according to some example embodiments of the inventive concepts. In more detail, FIG. 4 shows an example of operation S60 in a case in which the table extracted in operation S40 of FIG. 1 is a message table and FIGS. 5A and 5B respectively show examples of structured data generated from the message table, however the example embodiments are not limited thereto. As described above with reference to FIG. 1, in operation S60a of FIG. 4, an operation of generating structured data from a table may be performed. FIGS. 4 to 5B will be described hereinafter with reference to the message table T2a of FIG. 2A.

Referring to FIG. 4, in operation S61a, an operation of dividing (e.g., splitting, partitioning, etc.) a message table into a plurality of rows may be performed. For example, the message table T2a of FIG. 2A may be divided into the first row 24a and seven rows 25a, but is not limited thereto. As described above with reference to FIG. 2A, since each of the rest of the rows except for a first row in a message table corresponds to at least one IE, structured data corresponding to the at least one IE, that is, item data, may be generated by dividing the message table into a plurality of rows and sequentially processing the rows.

In operation S62a, an operation of moving to the next row may be performed. Thus, for example, the first row 24a including names of columns may be skipped, and a first row from among the seven rows 25a may be selected.

In operation S63a, an operation of performing lexical analysis on values of fields may be performed. As shown in FIG. 4, rule data D41 including a desired and/or predefined rule may be referred to, and lexical analysis may be performed on values of fields according to the desired and/or predefined rule. For example, fields included in a third column of the message table T2a may be separated into text indicating a type and a combination of a number and a period indicating a reference according to a desired and/or predefined rule. Also, a value of the last field of a row indicating a length may be determined with respect to a desired and/or threshold length or a range of length, and thus, the value of the field may be converted into a constant value or may be converted into two or more constant/variable values indicating a range. In some example embodiments, the rule data D41 may include a rule expressed as a regular expression, but the example embodiments are not limited thereto.

In operation S64a, an operation of generating item data may be performed. The item data, which is data corresponding to an item included in a table, may include attributes of the item. In the message table T2a, the item may be an IE, and the item data may correspond to one IE. Referring to FIGS. 2A and 5A, first item data D51 may be, for example, generated from a second row of the message table T2a, and similarly, for example, sixth and seventh item data D56 and D57 may be generated from seventh and eighth rows of the message table T2a, respectively. A set of item data corresponding to one or more items (that is, one or more IEs) may be referred to as item group data D50a.

As shown in FIG. 5A, the item data may have variables respectively corresponding to columns of the message table T2a, and the variables may be filled with values of fields of a corresponding row. In addition, since fields of the last column of the message table T2a may have a length or a range of length as a value, the item data may have a variable "lengthType", and the variable "lengthType" may have "const" or "var" as a value. For example, the sixth item data D56 may correspond to a seventh row of the message table T2a, and for a value "3-20" of a field corresponding to a length, may have a variable "lengthType" with "var" as a value, a variable "min-length" with "3" as a value, and a variable "max-length" with "20" as a value.

Referring to FIG. 4 again, in operation S65a, an operation of determining whether a row which is being currently processed is the last row of the message table T2a may be performed.

When the row being currently processed is the last row, operation S66a may be performed subsequently; otherwise, operation S62a may be performed.

In operation S66a, an operation of generating table data may be performed. The table data, which is data corresponding to a table, may include attributes of the table, but is not limited thereto. Referring to FIG. 5B, table data D50b may include a variable "Name" corresponding to a name of the table and a variable "itemList [ ]" corresponding to a pointer regarding item group data, and the variable "itemList [ ]" may include pointers regarding respective items. In some example embodiments, in a different way from that shown in FIG. 4, the table data may be generated during an early period of operation S60a.

FIG. 6 is a flowchart showing an example of operation S80 of FIG. 1, according to at least one example embodiment. FIGS. 7A and 7B show examples of a source code defining a message structure, according to example embodiments of the present disclosure. FIG. 8 shows an example of a source code defining codec, according to at least one example embodiment. In more detail, FIG. 6 shows an operation of generating source code from structured data generated from a message table, and FIGS. 7A to 8 show examples of a source code generated based on structured data of FIGS. 5A and 5B. As described above with reference to FIG. 1, in operation S80a of FIG. 6, an operation of generating source code (and/or output data including source code) from structured data may be performed. Although operation S80a is shown in FIG. 6 as including two operations (S82a and S84a), in some example embodiments, operation S80 of FIG. 1 may include only one of operations S82a and S84a of FIG. 6. FIGS. 6 to 8 will be hereinafter described with reference to FIGS. 5A and 5B.

Referring to FIG. 6, in operation S82a, an operation of generating a source code defining a message structure may be performed. The message structure may be associated with the communication protocol, may include IEs determined by a message table (e.g. T2a of FIG. 2A, etc.) as members, and may be written according to a type of the source code (e.g., source code type). For example, FIG. 7A shows a message structure D71 written in C language, and FIG. 7B shows a message structure D72 written in CSN.1, but the example embodiments are not limited thereto. Although not shown, in some example embodiments, the message structure may be written in other programming languages and/or descriptive languages, such as C++, etc., different from C language, in an interface description language, such as ASN.1, etc., in an interpreted language, such as Java, C#, etc., in a hardware description language, such as HDL or Verilog, etc., in a query language, such as SQL, SQLite, etc., and/or in a markup language, such as XML, HTML, etc.

Referring to FIG. 7A, the message structure D71 written in C language may have a structure name "UplinkBusy_t" extracted from the table data D50b, and may have structure members (lines 02-08) extracted from item data included in the item group data D50a. As shown in FIG. 7A, the message structure D71 may include a variable having a value of a variable "Type" of item data as a format and having an IE as a name as a member. In some example embodiments, the message structure D71 of FIG. 7A may match a structure used in a message codec function (e.g. "UplinkBusyEncoder" of FIG. 8), but the example embodiments are not limited thereto.

Referring to FIG. 7B, the message structure D72 written in CSN.1 may have a structure name "UPLINK BUSY" extracted from the table data D50b, and may have structure members (lines 02-08) extracted from item data included in the item group data D50a. In a similar way to the message structure D71 of FIG. 7A, the message structure D72 of FIG. 7B may also include a variable having a value of a variable "Type" of item data as a format and having an IE as a name as a member. In some example embodiments, the message structure D72 of FIG. 7B, which is intermediate data, may be used to generate source code of a desired programming language, but is not limited thereto.

Referring to FIG. 6 again, in operation S84a, an operation of generating source code defining a message codec function may be performed. In some example embodiments, the message codec function may be written in a programming language, and may include a message encoder function and/or a message decoder function. For example, the message encoder function may have data which will be transmitted through a communication channel as a parameter, and may generate a message by processing the data according to a communication protocol, etc. Also, the message decoder function may have a message received through a communication channel as a parameter, and may generate data by processing the message according to a communication protocol, etc.

Referring to FIG. 8, a message encoder function D81 written in C language may have a name "UplinkBusyEncoder" extracted from the table data D50b, and may have a body calling an IE codec function generated from item data included in the item group data D50a (lines 02-08). In addition, as shown in FIG. 8, the message encoder function D81 may have a parameter "input" with the message structure D71 of FIG. 7A as a format (e.g., line 01). The message encoder function D81 may provide members of the parameter "input" as a parameter of each IE codec function (e.g., lines 02-08).

Figures 10B, 11:
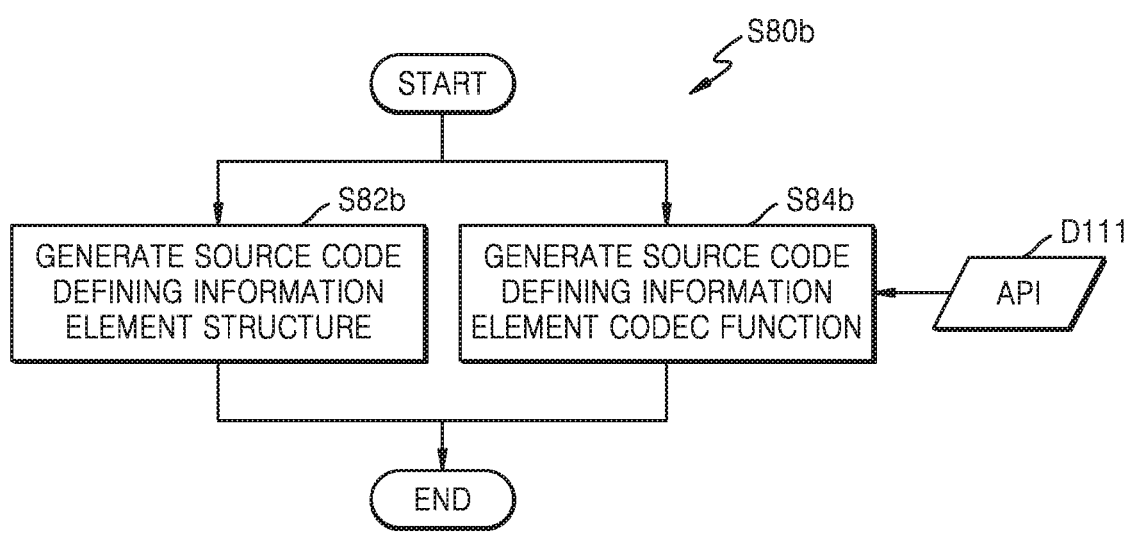

FIG. 9 is a flowchart showing an example of operation S60 of FIG. 1, according to at least one example embodiment. FIGS. 10A and 10B show examples of the structured data D13 of FIG. 1, according to some example embodiments of the inventive concepts. In more detail, FIG. 9 shows an example of operation S60 in a case in which the table extracted in operation S40 of FIG. 1 is an IE table, and FIGS. 10A and 10B respectively show examples of structured data generated from the IE table, however the example embodiments are not limited thereto. As described above with reference to FIG. 1, in operation S60b of FIG. 9, an operation of generating structured data from a table may be performed. FIGS. 9 to 10B will be hereinafter described with reference to the IE table T2b of FIG. 2B.

Referring to FIG. 9, in operation S61b, an operation of dividing an IE table into a plurality of rows may be performed. For example, the IE table T2b of FIG. 2B may be divided into the first row 24b and three rows 25b. As described above with reference to FIG. 2B, fields included in the rest of the rows except for a first row in an IE table may correspond, for example, to codes included in a bit sequence, and two or more fields may correspond to one code. The number of columns corresponding to one field may be referred to as a length of the field, and the sum of lengths of one or more fields corresponding to one code may be referred to as a length of the code (or a bit length).

In operation S62b, an initialization operation may be performed. For example, as shown in FIG. 9, a variable "C_LEN" may be set as zero. The variable "C_LEN", which is a variable indicating a code length, may have a value corresponding to a length of a code as lengths of fields are added up in the following operation.

In operation S63b, an operation of moving to the next row may be performed. Thus, the first row 24b including bit indexes may be skipped, and a first row from among the three rows 25b may be selected. Next, an operation of processing fields included in one row may be performed in operations S64_1b to S64_7b.

In operation S64_1b, an operation of performing lexical analysis on a value of a field may be performed. As shown in FIG. 9, rule data D91 including a desired and/or predefined rule may be referred to, and lexical analysis may be performed on a value of a field according to the desired and/or predefined rule. For example, a value of a field included in an IE table may be treated as text, and may be stored in a text-type variable. In operation S64_1b, an empty field, that is, a field having no value, like a first field of a second row of the IE table T2b may be detected, and processing on the empty field may be skipped, for example, operation S64_6b may be performed subsequently.

In operation S64_2b, an operation of determining whether to perform merger with a previous field may be performed. As shown in the IE table T2c of FIG. 2C, a code may have an 8-bit length or greater, or may extend over two or more continuous octets. Thus, a code corresponding to two or more fields in two or more rows may exist, and whether a current field is merged with a previous field may be determined. For example, when a value of the current field and a value of the previous field match each other, the two fields may be determined as corresponding to the same code, and it may be determined to merge the current field with the previous field. In some example embodiments, values having notation, e.g., "(high part)", "(low part)", "(high)", "(cont)", "(contd)", "(low)", etc., which indicates the location of a field in the code, removed from among values of fields may be compared with each other. When the current field and the previous field are merged with each other, operation S64_3b may be performed subsequently; otherwise, operation S64_4b may be performed subsequently. In addition, in the case of a first field of an IE table (except a field having no value), operation S64_3b may be performed subsequently to determine whether to perform merger with the first field during processing of the next field.

In operation S64_3b, the variable "C_LEN" may increase as much as a variable "F_LEN", and "F_LEN" may have a length of the current field as a value. Since the current field is determined, according to this example, as corresponding to the same code as the previous field by operation S64_2b, a length of the code may increase as much as a length of the current field. As shown in FIG. 9, operation S64_6b may be performed after operation S64_3b.

In operation S64_4b, an operation of generating item data may be performed. For example, since the current field is determined as corresponding to a different code from the previous field by operation S64_2b, item data of a code corresponding to the previous field may be generated. In the IE table T2b, an item may be a code, and item data may correspond to one code. Referring to FIGS. 2B and 10A, first item data D101 may be generated from a second field in a second row of the IE table T2b, second item data D102 may be generated from a field of a third row of the IE table T2b, and third to sixth item data D103 to D106 may be generated respectively from four fields of a fourth row of the IE table T2b. A set of item data corresponding to one or more items (that is, one or more codes) may be referred to as item group data D100a.

As shown in FIG. 10A, item data may have variables respectively corresponding to a type, a name, and a length of a code, etc., and the variables may be filled with values of a type, a name, and a length of a corresponding code, etc. For example, as shown in FIG. 10A, the type of the code may have one of predetermined values "IEI", "LENGTH", "VAL", and "SPARE", the name of the code may have "null" or a text value, and the length of the code may have a value of the variable "C_LEN" which is a positive integer value, but the example embodiments are not limited thereto.

Referring to FIG. 9 again, in operation S64_5b, a length value of the current field may be set as the variable "C_LEN". For example, since the current field is determined as corresponding to a different code from the previous field by operation S64_2b, a length of the current field may be set as a length of a code.

In operation S64_6b, an operation of determining whether the current field is the last field of a row may be performed. For example, whether the current field is an eighth field, except a ninth field indicating an octet index, may be determined. When it is determined that the current field is not the last field of a row, an operation of moving to the next field may be performed in operation S64_7b, and operation S64_1b may be performed subsequently. On the other hand, when it is determined that the current field is the last field of a row, an operation of determining whether the current row is the last row of a table may be performed in operation S65b. When the current row is not the last row, operation S63b may be performed subsequently, whereas, when the current row is the last row, operation S66b may be performed subsequently.

In operation S66b, an operation of generating item data may be performed. For example, if the current field is determined as the last field of the IE table T2b by operation S64_6b and operation S65b, last item data of the IE table T2b, which corresponds to the current field, may be generated.

In operation S67b, an operation of generating table data may be performed. Referring to FIG. 10B, table data D100b may include, for example, a variable "Name" corresponding to a name of a table, and a variable "itemList[ ]" corresponding to a pointer regarding item group data, etc., and the variable "itemList[ ]" may include pointers regarding respective items. In some example embodiments, in a different way from that shown in FIG. 9, the table data may be generated during an early period of operation S60b.

FIG. 11 is a flowchart showing an example of operation S80 of FIG. 1, according to at least one example embodiment. FIG. 12 shows an example of a source code defining an IE structure, according to at least one example embodiment. FIG. 13 shows an example of a source code defining codec, according to at least one example embodiment. In more detail, FIG. 11 shows an operation of generating source code from structured data generated from an IE table, and FIGS. 12 and 13 show examples of source code generated based on the structured data of FIGS. 10A and 10B. As described above with reference to FIG. 1, in operation S80b of FIG. 11, an operation of generating source code (and/or output data including source code) from structured data may be performed. Although operation S80b is shown in FIG. 11 as including two operations (e.g., S82b and S84b), in some example embodiments, operation S80 of FIG. 1 may include only one of operations S82b and S84b of FIG. 11. FIGS. 11 to 13 will be hereinafter described with reference to FIGS. 10A and 10B.

Referring to FIG. 11, in operation S82b, an operation of generating a source code defining an IE structure may be performed. The IE structure may include codes determined by an IE table (e.g. T2b of FIG. 2B) as members, and may be written according to a type of the source code. For example, FIG. 12 shows an IE structure D121 written in CSN.1, and in some example embodiments, the IE structure may be written in a programming language and/or descriptive languages, such as C language, an interface description language, such as ASN. 1, an interpreted language, such as Java, a hardware description language, such as HDL, a query language, such as SQL, a markup language, such as XML, etc.

Referring to FIG. 12, according to some example embodiments, the IE structure D121 written in CSN.1 may have a structure name "Talker Priority Status" extracted from the table data D100b (line 01), and may have structure members (lines 02-08) extracted from item data included in the item group data D100a. As shown in FIG. 12, members of the IE structure D121 may include information such as a name of a code, but is not limited thereto.

Referring to FIG. 11 again, in operation S84b, an operation of generating source code defining at least one IE codec function may be performed. In some example embodiments, the IE codec function may be written in, for example, a programming language, and may include an IE encoder function and/or an IE decoder function, but the example embodiments are not limited thereto. For example, the IE encoder function may have a value of an IE which will be transmitted through a communication channel as a parameter, and may generate the IE including codes by processing the value of the parameter according to a communication protocol. In addition, the IE decoder function may have an IE received through a communication channel as a parameter, may extract codes by processing the IE according to a communication protocol, and may detect information corresponding to values of the codes.

As shown in FIG. 11, the source code defining the IE codec function may be generated by referring to Application Programming Interface (API) data D111 including desired and/or predefined API functions. In some example embodiments, an API function may provide an independent operation to a desired communication protocol. For example, the API function may include a bit packing function which may be called in the IE encoder function, and may include a bit unpacking function which may be called in the IE decoder function, but the example embodiments are not limited thereto. An example of the API function will be described below with reference to FIG. 13.

Referring to FIG. 13, according to at least one example embodiment, an IE encoder function D131 written in C language may have a name (e.g., function name, class name, etc.) "TalkerPriorityStatusEncoder" extracted from the table data D100b (line 01), and may have a body (e.g., function code, etc.) calling an API function generated from item data included in the item group data D100a (e.g., lines 04-19). For example, as shown in FIG. 13, the IE encoder function D131 may have a parameter "packedLen" indicating a length of a code having been encoded to date, a parameter "target" indicating a pointer regarding data which will be converted into a code, and/or a parameter "buffer" indicating a pointer regarding a buffer where a code is stored (e.g., line 01), etc. According to at least one example embodiment, the IE encoder function D131 may call an API function "InitBuffer" to initialize the buffer, and may provide a length of a code as a parameter. Also, the IE encoder function D131 may call an API function "BitPacking8" to add a code to the buffer, and may provide a value of a code, a length of a code, and a length of a code having been encoded to date as a parameter, etc. In addition, according to the item data D104 of FIG. 10A corresponding to "Spare" of the IE table T2b of FIG. 2B, as an example, the IE encoder function D131 may increase the variable "packedLen" as much as a length of "Spare" code without calling an API function (e.g., line 13).

The IE encoder function D131 may return the variable "packedLen" returned after finishing encoding of codes (e.g., line 21), and a value of the variable "packedLen" may be provided as a parameter to call another IE encoder function.

In some example embodiments, an API function called in an IE codec function may be determined according to a length of a code included in an IE. For example, API data may include a plurality of bit packing functions, e.g., "BitPacking8", "BitPacking16", "BitPacking32", "BitPackingOver32", etc., according to a bit number of data which will be packed. As shown in FIG. 13, while the IE encoder function D131 may call an API function "BitPacking8" for codes having an 8-bit length or less, for example, the code "Mobile Time Difference Value" defined by the IE table T2c of FIG. 2C may have a 21-bit length, and thus, an IE encoder function for an IE "Mobile Time Difference" defined by the IE table T2c may call "BitPacking32" to add the code "Mobile Time Difference Value" to a buffer.

Figure 14:
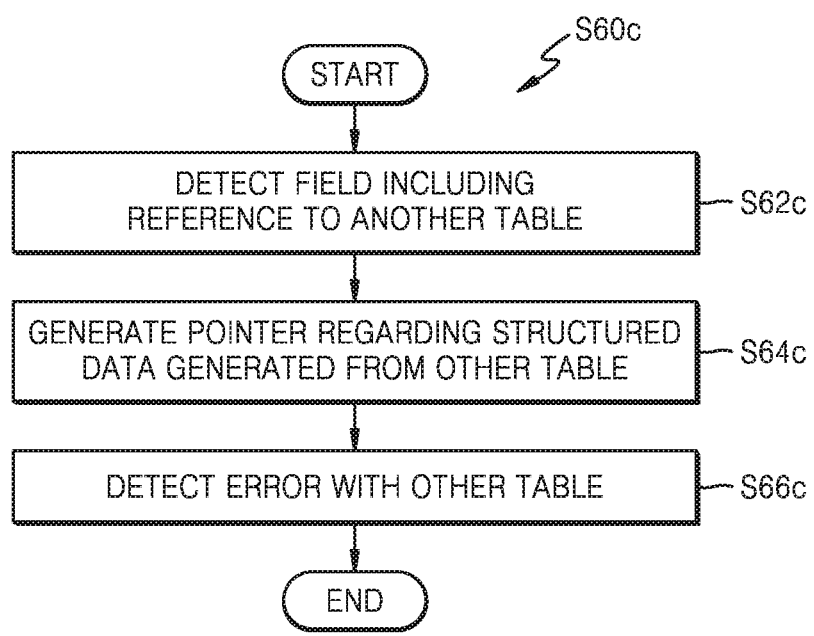
FIG. 14 shows an example of operation S60 of FIG. 1, according to at least one example embodiment.

FIG. 14 shows an example of operation S60 of FIG. 1, according to at least one example embodiment. As described above with reference to FIG. 1, in operation S60c of FIG. 14, an operation of generating structured data from a table may be performed. In the example of FIG. 14, reference to another table, or a plurality of other tables (e.g., second tables, etc.), which is included in a field of the (first) table, may be used to generate structured data, and FIG. 14 will be hereinafter described with reference to the tables (T2a and T2b) of FIGS. 2A and 2B, but the example embodiments are not limited thereto.

The field of the table included in input data may include reference to one or more other (second) tables as a value. As shown in FIG. 2A, fields included in a third column of the message table T2a may have an index of another table together with a type of an IE as a value. For example, a field corresponding to a third column at a fifth row of the message table T2a may have "10.5.2.64", which is an index of another table, as a value, and the index "10.5.2.64" may refer to the IE table T2b of FIG. 2B. As will be described below, reference to another table(s) may be used during a process of generating structured data from a table, and thus, efficiency of the operation of generating structured data may increase.

In operation S62c, an operation of detecting a field including reference to another table may be performed. In some example embodiments, as shown in the message table T2a of FIG. 2A, fields included in a certain column may be desired and/or predefined as including at least one reference to one or more other tables, and the at least one reference to the one or more other tables, that is, an index of the other table (e.g., a pointer to the other table, a memory location of the other table, an identifier of the other table, etc.), may be extracted by performing lexical analysis on a value of a field. In some example embodiments, a value having the same format as an index of another table may be detected during a process of performing lexical analysis on a value of a field.

In operation S64c, according to at least one example embodiment, an operation of generating a pointer regarding structured data generated from the other table based on the reference may be performed. For example, pointers regarding table data and item group data generated from the other table may be generated, and the table data and item group data generated from the other table may be accessed by using the generated pointers. Thus, as shown in the tables (e.g., T2a and T2b) of FIGS. 2A and 2B, a message table may be connected to one or more IE tables.

In operation S66c, an operation of detecting an error with the other table may be performed. In some example embodiments, an operation of generating structured data from the other table may be performed, and an error may be detected by comparing structured data generated from a current table with structured data generated from the other table. For example, during a process of generating structured data from the message table T2a of FIG. 2A, the IE table T2b may be accessed according to the index "10.5.2.64" detected as reference to the IE table T2b of FIG. 2B, and structured data may be generated from the IE table T2b. Next, "Talker Priority Status", which is a value extracted from a field of the message table T2a, may be compared with a name "Talker Priority Status" of the IE table T2b. In addition, a value associated with the extracted field, such as "3", which is a length extracted from a field of the message table T2a, may be compared with a value of the IE table T2b, such as the octet number of the IE table T2b. A mismatch occurring during such a comparison process may be detected as an error, and when an error is detected, in some example embodiments, the operation of generating structure data may be stopped, and in some example embodiments, error information may be added to log data generated together with structured data and the source code. As described above, detection of an error included in specifications defining a communication protocol allows detection of an error during an early period of a process of implementing a function according to the communication protocol.

Figure 15:
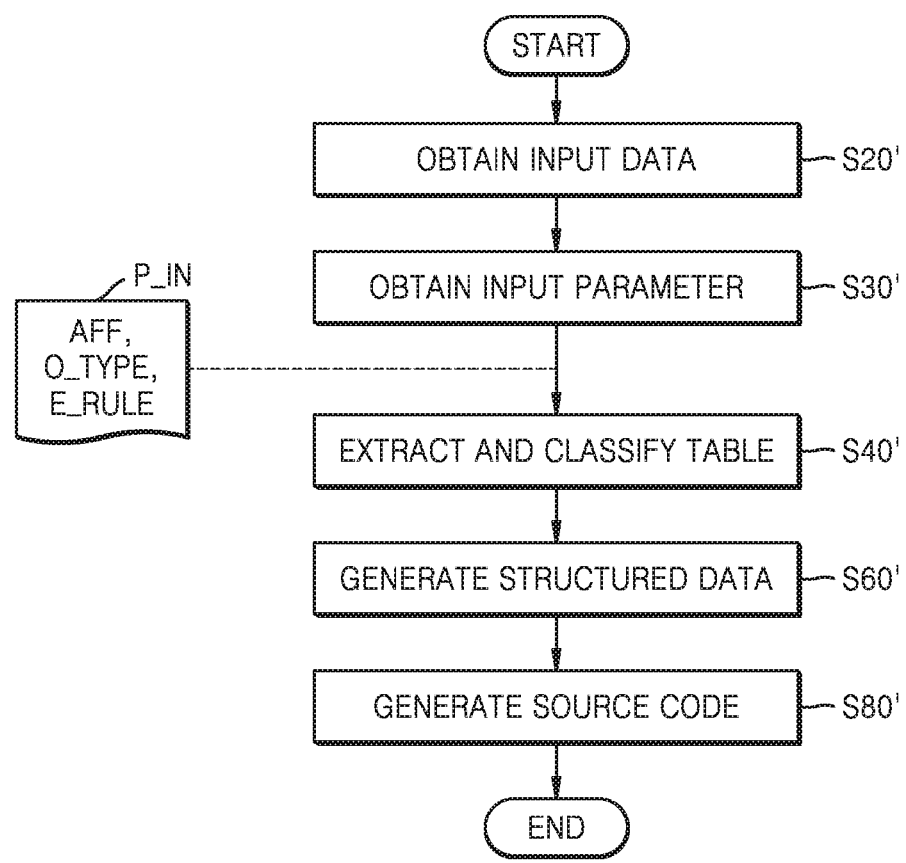
FIG. 15 is a flowchart showing a method of generating and/or automatically generating a source code, according to at least one example embodiment.

FIG. 15 is a flowchart showing a method of generating and/or automatically generating source code, according to at least one example embodiment. When compared with the method of FIG. 1, the method of FIG. 15 may further include an operation of obtaining an input parameter (e.g., operation S30'). A redundant description of FIG. 15 given above with reference to FIG. 1 will be omitted below.

In operation S20', an operation of obtaining input data may be performed, and in operation S30', an operation of obtaining an input parameter P_IN may be performed. In some example embodiments, in a different way from that shown in FIG. 15, the operation of obtaining the input parameter P_IN may precede the operation of obtaining input data. In some example embodiments, the input parameter P_IN may include at least one of an affix AFF, a type of a source code O_TYPE, and/or an encoding rule E_RULE, etc., but the example embodiments are not limited thereto. As described above, the method of generating and/or automatically generating a source code may generate source code having an increased and/or high utilization according to requirements of a designer by supporting an input parameter.

In operation S40', an operation of extracting and classifying a table may be performed, and in operation S60', an operation of generating structured data may be performed. In some example embodiments, structured data may be generated based on the input parameter P_IN. For example, the input parameter P_IN may include the affix AFF, and the affix AFF may include a prefix and/or a suffix, etc. Table data and/or item data included in the structured data may include a variable, etc., having a value obtained by adding the affix AFF included in the input parameter P_IN to a value extracted from the input data as a name, and as a result, the affix AFF may also be reflected in a source code generated based on the structured data.

In operation S80', an operation of generating source code may be performed. In some example embodiments, the source code may be generated based on the input parameter P_IN. For example, the input parameter P_IN may include the type of the source code O_TYPE, but is not limited thereto, and the type of the source code O_TYPE may indicate a language, e.g., a programming language, CSN.1, ASN.1, etc., in which the source code is written. Thus, the source code may be written in the language that the type of the source code O_TYPE indicates. The encoding rule E_RULE may indicate, as a non-limiting example, one of encoding rules such as Distinguished Encoding Rules (DER), Basic Encoding Rules (BER), Canonical Encoding Rules (CER), XML Encoding Rules (XER), Canonical XML Encoding Rules (CXER), Extended XML Encoding Rules (E-XER), Packed Encoding Rules (PER, unaligned: UPER, canonical: CPER), Octet Encoding Rules (OER, canonical: COER), JSON Encoding Rules (JER), and Generic String Encoding Rules (GSER), etc., and in the source code, codec may be defined according to the encoding rule E_RULE.

Figure 16:
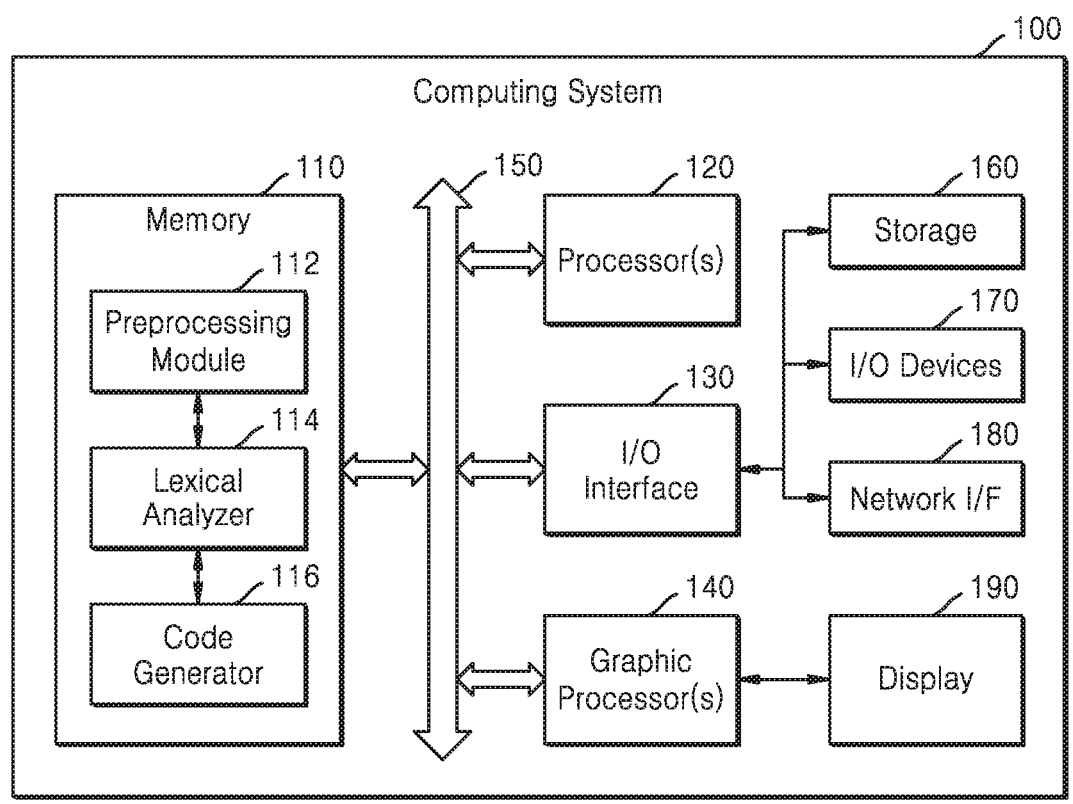
FIG. 16 is a block diagram showing a computing system according to at least one example embodiment.

FIG. 16 is a block diagram showing the computing system 100 according to at least one example embodiment. In some example embodiments, a method of generating a source code may be performed by the computing system 100 of FIG. 16. As shown in FIG. 16, the computing system 100 may include a memory 110, at least one processor 120, an input/output (I/O) interface 130, a graphics processor 140, a bus 150, a storage 160, I/O devices 170, a network interface (I/F) 180, and/or a display 190, etc., but the example embodiments are not limited thereto. The memory 110, the at least one processor 120, the I/O interface 130, and the graphics processor 140 may communicate with one another through the bus 150. FIG. 16 will be hereinafter described with reference to FIG. 1.

The memory 110 may include a volatile memory device and/or a non-volatile memory device, and may store instructions which are executed by the at least one processor 120. As shown in FIG. 16, the memory 110 may store a preprocessing module 112, a lexical analyzer 114, and/or a code generator 116, etc., as a set of a series of instructions (e.g., computer readable instructions). Each of the preprocessing module 112, the lexical analyzer 114, and the code generator 116 may be referred to as a procedure, a sub-routine, a software module, etc., as a set of instructions for performing a certain function. The at least one processor 120 may perform a certain function by executing a procedure stored in the memory 110, and according to at least one example embodiment, the at least one processor 120 performing a function by executing a procedure may be referred to as the procedure performing the function.

In some example embodiments, procedures stored in the memory 110 may respectively perform operations corresponding to the operations of FIG. 1. For example, the preprocessing module 112 may be configured to extract a table from input data and classify the table, the lexical analyzer 114 may be configured to generate structured data by performing lexical analysis on values of fields included in the table, and the code generator 116 may be configured to generate a source code from the structured data.

The I/O interface 130 may provide connections to a network (e.g. LAN, WAN) through the network I/F 180, the I/O devices 170 (e.g. a mouse, a keyboard, a speaker, a printer, a camera, other I/O devices), and the storage 160 (e.g. a computer-readable medium). In some example embodiments, the I/O interface 130 may provide data for performing a method of generating and/or automatically generating a source code. For example, the storage 160 may store the input data D11, the structured data D13 and/or the output data D14 including source code, of FIG. 1. In some example embodiments, the input data D11 may be obtained through the network I/F 180, and the structured data D13 and the output data D14 may be output to the outside of the computing system 100 through the network I/F 180. In some example embodiments, the input data D11 and the input parameter P_IN of FIG. 15 may be obtained through the I/O devices 170, and the structured data D13 and the output data D14 may be output to the outside of the computing system 100 through the I/O devices 170.

The graphics processor 140 may drive the display 190, and the display 190 may visually output the structured data D13 and/or the source code generated according to example embodiments of the present disclosure.

Figure 17:
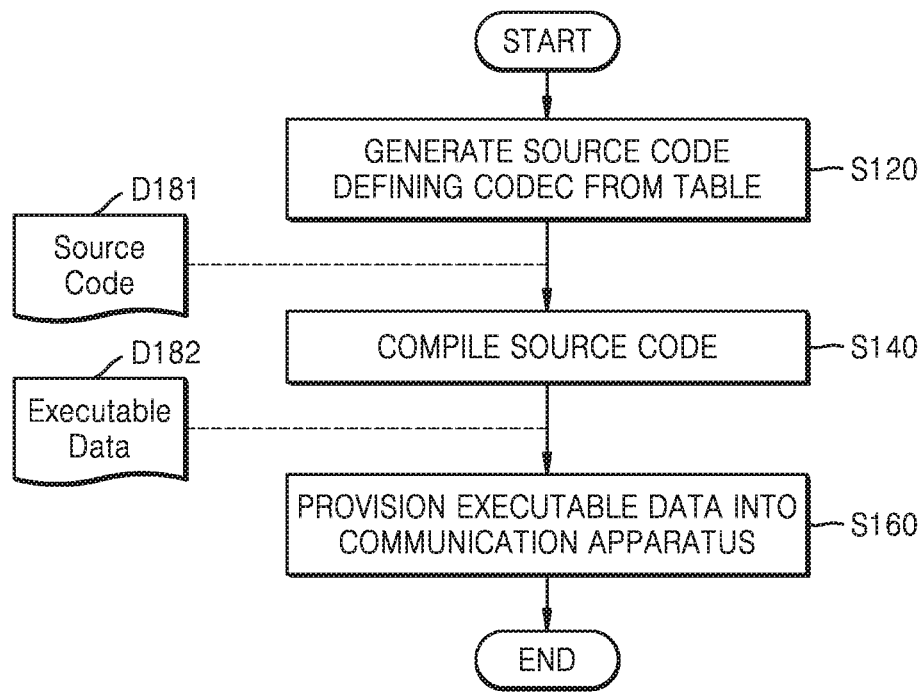
FIG. 17 is a flowchart showing a control method of a communication apparatus, according to at least one example embodiment.
Figure 18:
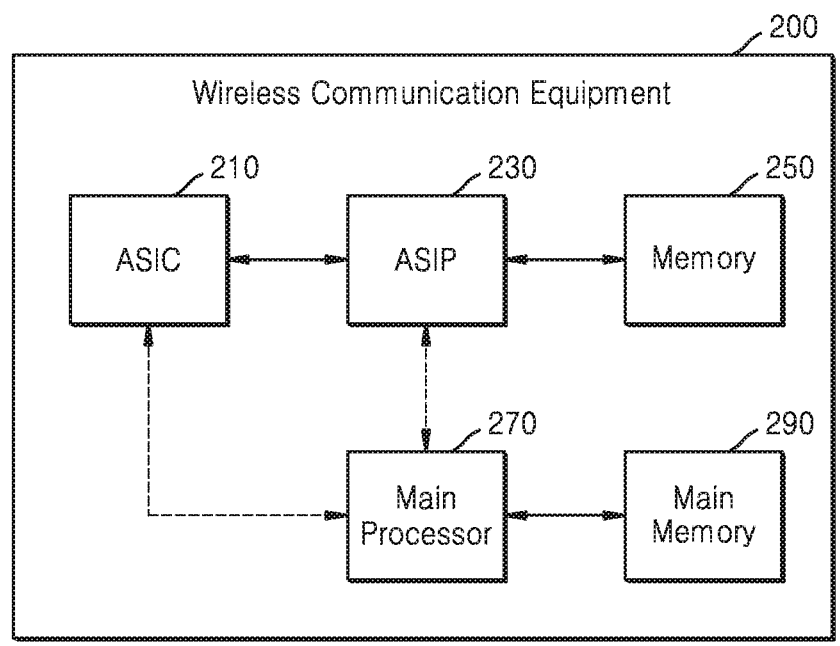
FIG. 18 is a block diagram showing an example of a communication apparatus according to at least one example embodiment.

FIG. 17 is a flowchart showing a control method of a communication apparatus, according to at least one example embodiment. FIG. 18 is a block diagram showing an example of a communication apparatus according to at least one example embodiment.

The communication apparatus may be an apparatus for performing communication according to a communication protocol. The communication apparatus, as a non-limiting example, may refer to a base station providing wireless communication or user equipment, in a wireless communication system such as a Long Term Evolution (LTE) system, a Code Division Multiple Access (CDMA) system, a Global System for Mobile Communications (GSM) system, a Wireless Local Area Network (WLAN) system, etc., or may refer to a component (e.g. a modem) included in the base station or the user equipment.

Referring to FIG. 17, in operation S120, an operation of generating a source code D181 defining codec from a table may be performed. The table may be included in input data as specifications defining a communication protocol, and according to example embodiments of the present disclosure, the source code D181 may be generated and/or automatically generated from the table.

In operation S140, an operation of compiling the source code D181 may be performed. For example, when the source code D181 is written in a programming language, the source code D181 may be complied by a compiler of the programming language, and executable data D182 may be generated. When the source code D181 is written in CSN.1 or ASN.1, for example, the source code D181 may be converted into source code written in a programming language, the source code may be compiled by a compiler and/or interpreted by an interpreter of the programming language, and the executable data D182 may be generated. The executable data D182 may include a plurality of computer readable instructions executable by at least one processor.

In operation S160, an operation of provisioning executable data into the communication apparatus may be performed. For example, the communication apparatus may include a non-volatile memory device accessible by at least one processor, and executable data may be provisioned into the communication apparatus by programming the executable data D182 into the non-volatile memory device. The communication apparatus may provide communication following a communication protocol according to the executable data D182.

Referring to FIG. 18, as an example of a communication apparatus, wireless communication equipment 200 may include an Application Specific Integrated Circuit (ASIC) 210, an Application Specific Instruction set Processor (ASIP) 230, a memory 250, a main processor 270, and a main memory 290. At least two of the ASIC 210, the ASIP 230, and the main processor 270 may communicate with each other. Also, at least two of the ASIC 210, the ASIP 230, the memory 250, the main processor 270, and the main memory 290 may be embedded in one chip.

The ASIP 230, which is an integrated circuit customized for a certain purpose, may support an instruction set only for a certain application, and may execute instructions included in the instruction set. The memory 250 may communicate with the ASIP 230, and as a non-transitory storage device, may store a plurality of instructions executed by the ASIP 230, and in some example embodiments, may store the executable data D182 of FIG. 17. As a non-limiting example, the memory 250 may include any type of memory accessible by the ASIP 230, such as Random Access Memory (RAM), Read Only Memory (ROM), a tape, a magnetic disk, an optical disk, volatile memory, non-volatile memory, etc., and/or a combination thereof.

The ASIP 230 may perform an operation according to a communication protocol by executing a series of instructions included in the executable data D182 stored in the memory 250.

The main processor 270 may control the wireless communication equipment 200 by executing a plurality of instructions. For example, the main processor 270 may control the ASIC 210 and the ASIP 230, and may process data received via a wireless communication network or a user input to the wireless communication equipment 200. The main memory 290 may communicate with the main processor 270, and as a non-transitory storage device, may store a plurality of instructions executed by the main processor 270.

Figure 19:
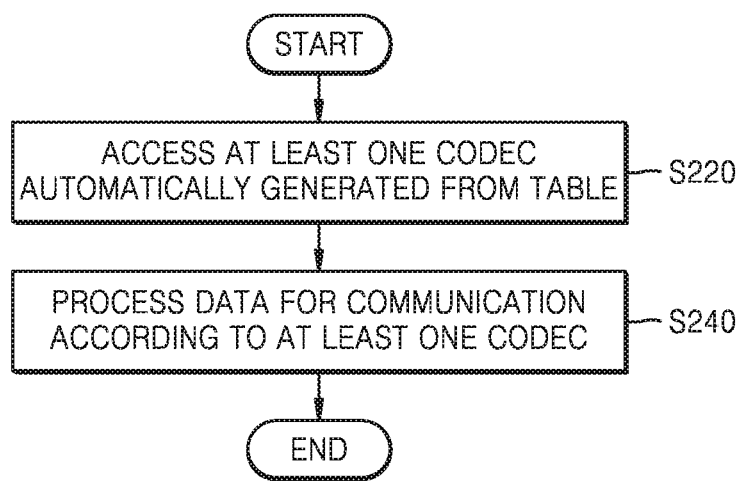
FIG. 19 is a flowchart showing an operation method of a communication apparatus, according to at least one example embodiment.
Figure 20:
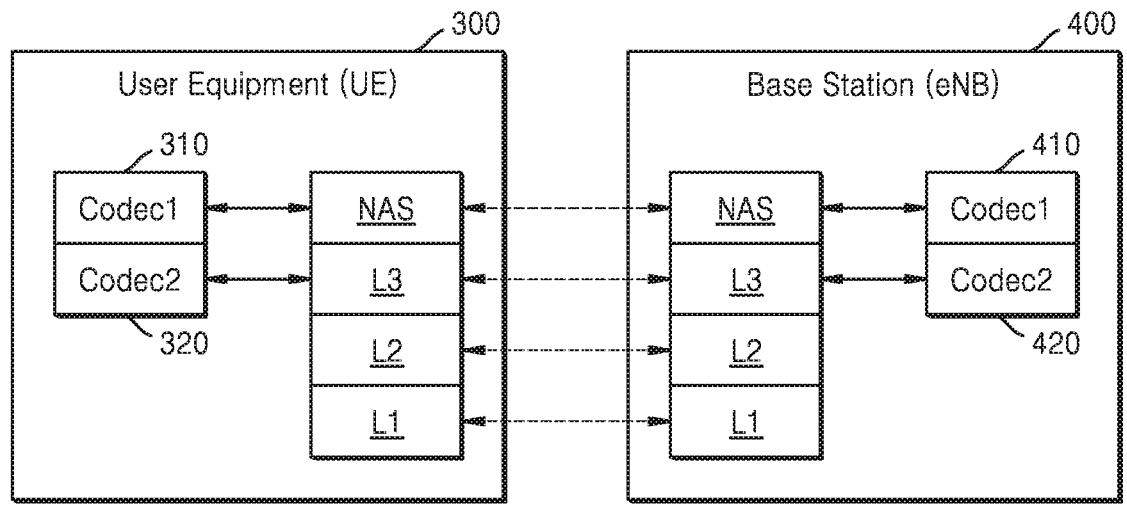
FIG. 20 shows an example of an operation in which two communication apparatuses communicate with each other, according to at least one example embodiment.

FIG. 19 is a flowchart showing an operation method of a communication apparatus, according to at least one example embodiment. FIG. 20 shows an example of an operation in which two communication apparatuses communicate with each other, according to at least one example embodiment. In more detail, FIG. 19 shows an operation method of a communication apparatus, which is performed by at least one processor included in the communication apparatus, and FIG. 20 shows an example of an operation in which user equipment (UE) 300 and a base station 400 communicate with each other in a wireless communication system. In a similar way to the communication apparatus of FIG. 18, in an operation method of a communication apparatus of FIG. 19, the communication apparatus may be an apparatus for providing communication according to a communication protocol.

Referring to FIG. 19, in operation S220, an operation of accessing at least one codec automatically generated from a table may be performed. For example, according to some example embodiments of the inventive concepts, a codec may be generated and/or automatically generated from a table as specifications defining a communication protocol, and may include a series of instructions. The codec may be stored in a memory device, and at least one processor may access the memory device storing the codec during an operation for communication, e.g., at start of transmission and/or reception. In some example embodiments, the operation of accessing codec may include an operation in which a series of instructions included in the codec are called by the at least one processor.

Referring to FIG. 20, the UE 300, which is wireless communication equipment, may be fixed and/or be mobile, and may refer to various pieces of equipment capable of transmitting and receiving data and/or control information in communication with the base station 400. For example, the user equipment 300 may be referred to as terminal equipment, a mobile station (MS), a mobile terminal (MT), a user terminal (UT), a subscriber station (SS), a wireless device, a handheld device, etc. The base station 400 may generally refer to a fixed station communicating with UE and/or another base station, and may exchange data and control information by communicating with the UE and/or the other base station. For example, the base station 400 may be referred to as Node B, evolved-Node B (eNB), a sector, a site, a base transceiver station (BTS), an access point (AP), Relay Node, a remote radio head (RRH), a radio unit (RU), a small cell, etc.

The codec automatically generated from the table may include two or more codecs which are used in two or more layers in a protocol stack. For example, as shown in FIG. 20, the UE 300 may include first and second codecs 310 and 320, and the base station 400 may also include first and second codecs 410 and 420. The first codecs 310 and 410 may provide an encoder/decoder which is used in Non-Access Stratum (NAS) of a communication protocol, and the second codecs 320 and 420 may provide an encoder/decoder which is used in L3.

Referring to FIG. 19 again, in operation S240, an operation of processing data for communication according to the at least one codec may be performed. For example, the processor may access codec defining an encoder, and may generate encoded data by processing data which will be transmitted according to the encoder. Also, the processor may access codec defining a decoder, and may generate decoded data by processing received data according to the decoder.

While the inventive concepts has been particularly shown and described with reference to example embodiments thereof, it will be understood that various changes in form and details may be made therein without departing from the spirit and scope of the following claims.

What is claimed is:

1. A method of generating source code for implementing at least one function in hardware according to specifications defining a communication protocol, the method comprising:
   obtaining, using at least one processor, input data comprising the specifications defining the communication protocol;
   preprocessing, using the at least one processor, the input data by extracting at least one first table from the input data, the extracted at least one first table comprising a plurality of fields from the input data;
   classifying, using the at least one processor, the extracted at least one first table according to a classification type;
   generating, using the at least one processor, structured data by performing lexical analysis on values of the plurality of fields of the extracted at least one first table according to a desired and/or predefined rule associated with the classification type of the extracted at least one first table; and
   generating, using the at least one processor, the source code from the structured data to implement the at least one function in hardware according to the specifications defining the communication protocol.

2. The method of claim 1, wherein the preprocessing of the input data comprises:
   classifying the extracted at least one first table based on at least one of a title of the at least one first table, values of fields included in a first row of the at least one first table, and a number of columns included in the at least one first table.

3. The method of claim 1, wherein the preprocessing of the input data comprises:
   classifying the extracted at least one first table as a message table or an information element table.

4. The method of claim 1, wherein the generating of the structured data comprises:
   generating table data comprising attributes of the at least one first table; and
   generating item group data comprising attributes of at least one item included in the at least one first table.

5. The method of claim 4, wherein the table data comprises a title of the at least one first table and a pointer regarding the item group data.

6. The method of claim 4, wherein:
   the generating of the item group data comprises generating item data; and
   the item data includes values of fields included in a row of the at least one first table classified as a message table.

7. The method of claim 6, wherein:
   the generating of the source code comprises defining a message structure of the source code by extracting a structure name from the table data, and extracting a structure member from the item data; and
   the message structure of the source code is associated with the communication protocol.

8. The method of claim 6, wherein the generating of the source code comprises:
   extracting a name and a parameter of a message codec function from the table data;
   extracting a name and a parameter of an information element codec function from the item data; and
   defining the message codec function calling the information element codec function in the source code.

9. The method of claim 4, wherein the generating of the item group data comprises:
   generating item data comprising a value of at least one merged field of the at least one first table classified as an information element table, and a length of the at least one merged field of the at least one first table classified as the information element table.

10. The method of claim 9, wherein the generating of the source code comprises:
    defining an information element structure in the source code by extracting a name of an information element from the table data, and extracting a code name and a code length from the item data.

11. The method of claim 9, wherein the generating of the source code comprises:
    extracting a parameter name and a parameter type of an information element codec function from the table data;
    extracting a value of an application programming interface (API) parameter of a desired API function from the item data; and
    defining the information element codec function calling the desired API function in the source code.

12. The method of claim 1, wherein the source code is written in a programming language, Abstract Syntax Notation One (ASN.1), or Concrete Syntax Notation One (CSN.1).

13. The method of claim 1, further comprising:
    obtaining, using the at least one processor, an input parameter comprising an affix, wherein the structured data includes a value comprising the affix.

14. The method of claim 1, further comprising:
    obtaining, using the at least one processor, an input parameter comprising at least one of a type of the source code and an encoding rule,
    wherein the source code is based on at least one of the type of the source code and the encoding rule.

15. The method of claim 1, wherein the generating of the structured data comprises:
- detecting a field comprising a reference to at least one second table; and
- generating a pointer regarding structured data generated from the at least one second table based on the reference to the at least one second table.

16. The method of claim 15, wherein the generating of the structured data further comprises detecting an error between the at least one first table and the at least one second table by using the pointer.

17. The method of claim 1, wherein:
- the preprocessing of the input data comprises extracting table contents from the input data;
- the extracting of the at least one first table is based on the extracted table contents; and
- the classifying of the extracted at least one first table is based on the extracted table contents.

18. A control method of a communication apparatus for performing communication according to specifications defining a communication protocol, the control method comprising:
- obtaining, using at least one first processor, a source code generated by the method of claim 1;
- compiling, using the at least one first processor, the source code to generate executable data; and
- provisioning, using the at least one first processor, the executable data into the communication apparatus.

19. The control method of claim 18, wherein:
- the communication apparatus comprises a memory device and at least one second processor configured to execute computer readable instructions stored in the memory device; and
- the executable data comprises the computer readable instructions executable by the at least one second processor.

20. An operation method of a communication apparatus for performing communication according to specifications defining a communication protocol, the operation method comprising:
- accessing, using at least one processor, at least one codec generated from a source code, the source code being generated by the method of claim 1; and
- processing, using the at least one processor, communication data corresponding to the communication protocol based on the at least one codec.

* * * * *